Patented Apr. 20, 1926.

1,581,618

UNITED STATES PATENT OFFICE.

NATHAN SULZBERGER, OF NEW YORK, N. Y.

PAPER.

No Drawing.   Application filed April 30, 1921.   Serial No. 465,700.

*To all whom it may concern:*

Be it known that I, NATHAN SULZBERGER, a citizen of the United States, residing at Hotel Netherland, 59th Street and Fifth Ave., New York city, in the county and State of New York, have invented new and useful Improvements in Paper, of which the following is a specification.

Paper, ordinary, as well as in particular also asbestos paper, generally contains a sizing-material of organic origin and nature. In fact, almost the only sizing-materials used are gelatine, "animal size", rosin and casein. These substances, as is readily seen, are not of a stable composition and will tend to decomposition, thereby in various ways disadvantageously affecting the paper by discoloration etc.

I have found, that in many instances the above and other objections may be overcome by using a material of inorganic origin, such an one as can be obtained in a colloidal state being of especial advantage.

As an example, I will describe the use of colloidal aluminum-silicate in preparing an asbestos paper, without, however, limiting myself in any way to the method employed or the amounts used:

Long fibre asbestos was beaten and about 40% of the aluminum-silicate in solution was added. The paper obtained was perfectly white in color and opaque. It is best to mix the aluminum-silicate with about 7 times the amount of water and allow the same to stand for about 24 hours, when a pasty mass will be obtained, which can be thinned down to the desired concentration. Aluminum silicate is a salt-like compound or combination of alumina and silica, and, in a collodial state, has valuable properties as a binder. When the pasty mass produced, for example, as above described by mixing the colloidal aluminum silicate with about seven times the amount of water and allowing it to stand, is thinned down, it forms a colloidal solution having valuable properties for use in the manufacture of asbestos paper. Because of its salt-like nature and its colloidal character, its binding action is colloidal in character.

In similar manner other papers may be made containing varying percentages of the silicate. Other ingredients for specific purposes as will be of advantage for the particular use and quality of the paper desired may be added, as will suggest themselves to those skilled in the art. Thus fillers, like calcium-carbonate etc. may be added; also ingredients of an oxidizing nature as saltpetre, which will be of particular advantage in making an asbestos paper for wrapping cigarettes and making cigar and cigarette holders. Certain oxidizing effects may also be produced by using nitrocellulose in various quantities and embodying the same in the pulp and paper. Ordinary paper pulp may also in cases be advantageously mixed with the asbestos, thereby producing a "composite" paper, which may or may not still have other materials mixed with it.

The finished paper may in cases be preferably treated with materials as the oxidizing agent, as, for example, saltpetre when making an asbestos wrapper for cigarettes. The paper may also be suitably colored and finished off smoothly or roughly. For insulating purposes an asbestos paper sized with aluminum-silicate and free from all organic matter, or practically free, may be of particular advantage. The paper may be treated also so as to allow printing and drawings, etc., to be placed on the same. Of course, organic sizing and other material may be added; the main idea of this invention being the paper (or pulp) containing an inorganic colloid as for example and of the nature and behaviour similar or identical with colloidal aluminum-silicate. This silicate is also well adapted as a paste or adhesive to fasten together, for example, the sides of asbestos paper for cigarette wrappers. For this latter purpose the paper may be cut in reel-shape, say, of about one and one quarter inches wide. Other cuts and shapes, as tubes etc., may also be made.

Such asbestos-paper may further be found of good advantage where it is intended for use for printing or inscribing on the same matter of great importance which it is desired to preserve through long ages.

In some instances, where, particularly, the color is not objectionable, colloidal graphite may be used.

For certain purposes, as when making cigarette wrapping material the pulp of asbestos or the paper made may be treated with an oxidizing agent (with or without the addition of a catalytic acting medium) like saltpetre and the paper then heated to temperature high enough to eliminate (or practically so) any organic matter present and which might tend to give off some undesirable odor, when smoking or objectionally discolor the wrapper. Such wrapper will retain its shape and also hold the ashes from falling out and also protect to a large extent from danger of fire, as such wrapper will keep sparks from falling around, particularly if the lit end of the cigarette is closed, which may be accomplished in various ways, as for example, by folding a projecting piece of the paper over the tobacco in front and back into the wrapper. There is also less fire danger, when throwing the glowing cigarette away, as the unburnable wrapper will avoid direct contact with outside material. Of course, a suitable tip may also be used for the cigarette. In cases, the roughing or corrugation of the inside side of the wrapper may protect the ashes of the burned tobacco from falling out, while the outside side of the wrapper may be smooth (or glazed with the help of proper substances). The paper may be stuck together with an adhesive of organic or inorganic origin (like a silicate-colloidal aluminum-silicate, sodium-silicate etc.), or it may be fastened sufficiently well with water (which may contain chemicals, as saltpetre etc.) or even licked together, as is now done when "rolling your own". For this latter method the asbestos may be supplied in thin sheets of proper size and in booklet form. Cigarettes with this wrapper will also be found to smolder less, when laying aside and can be easily relit, in case, after laying aside for some time, they should have gone out. Of course, they can be made of any kind of tobacco or material desirable as a smoke. Instead of sheets, the unburnable wrapper may also be used and supplied in tube-form, which are to be filled with the tobacco.

Cork and other mouth-tips may be used, as well as the mouth-end of the wrapper itself suitably treated.

The asbestos material is also of value as a carrier for catalytic material (nickel, platinum, etc., or salts, etc.) and may be used in many catalytic processes.

When adding an oxidizing agent in an asbestos wrapper it is often advantageous to use the same in excess, so that the wrapper will contain sufficient to also help with the combustion of the tobacco, as even a wrapper free from organic material will discolor when smoking, if not sufficient of the oxidizing agent is present due to the organic matter of the tobacco itself. Instead of using solely the colloidal inorganic binder, this may be used in connection with other binding-material of organic or inorganic nature.

In a copending application, Serial No. 493,421, I have described a thin flexible asbestos paper free from organic matter and made of such thinness as to approach tissue or like thin flexible papers.

I claim:—

1. Process for making asbestos paper comprising the use of colloidal aluminum silicate and an oxidizing agent.

2. Process for making asbestos paper comprising the use of colloidal aluminum silicate and saltpetre.

3. Asbestos paper containing colloidal aluminum silicate and an oxidizing agent.

4. Asbestos paper containing colloidal aluminum silicate as a binding material and saltpetre.

5. Asbestos paper containing colloidal aluminum silicate and saltpetre and free from organic material.

NATHAN SULZBERGER.